(12) United States Patent
Shimokawa (10) Patent No.: US 8,482,159 B2
(45) Date of Patent: *Jul. 9, 2013

(54) WIRELESS POWER APPARATUS AND WIRELESS POWER-RECEIVING METHOD

(75) Inventor: Satoshi Shimokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 231 days.

This patent is subject to a terminal disclaimer.

(21) Appl. No.: 12/750,774

(22) Filed: Mar. 31, 2010

(65) Prior Publication Data

US 2010/0244583 A1 Sep. 30, 2010

(30) Foreign Application Priority Data

Mar. 31, 2009 (JP) .................................. 2009-085281

(51) Int. Cl.
  *H01F 27/42* (2006.01)
  *H01F 37/00* (2006.01)
  *H01F 38/00* (2006.01)

(52) U.S. Cl.
  USPC ......................................................... 307/104

(58) Field of Classification Search
  None
  See application file for complete search history.

(56) References Cited

U.S. PATENT DOCUMENTS

| | | | |
|---|---|---|---|
| 2,967,267 A * | 1/1961 | Steinman et al. | 361/730 |
| 5,455,467 A * | 10/1995 | Young et al. | 307/104 |
| 5,821,731 A | 10/1998 | Kuki et al. | |
| 6,958,583 B1 * | 10/2005 | An | 315/291 |
| 7,667,352 B2 * | 2/2010 | Drechsler et al. | 307/104 |
| 2007/0222542 A1 | 9/2007 | Joannopoulos | |
| 2008/0079392 A1 * | 4/2008 | Baarman et al. | 320/108 |
| 2008/0266748 A1 | 10/2008 | Lee | |
| 2008/0278264 A1 | 11/2008 | Karalis | |
| 2011/0254378 A1 * | 10/2011 | Ichikawa et al. | 307/104 |
| 2011/0285210 A1 * | 11/2011 | Lemmens et al. | 307/104 |

FOREIGN PATENT DOCUMENTS

| | | |
|---|---|---|
| JP | 2002-101578 | 4/2002 |
| JP | 2008-508842 A | 3/2008 |
| JP | 2009-501510 A | 1/2009 |
| WO | WO-2006/011769 | 2/2006 |
| WO | WO-2007/008646 | 1/2007 |

OTHER PUBLICATIONS

USPTO (Amaya), Non-Final Rejection dated Dec. 21, 2011 issued in U.S. Appl. No. 12/721,770 (now allowed).
USPTO (Amaya), Final Rejection dated Jun. 26, 2012 issued in U.S. Appl. No. 12/721,770 (now allowed).
USPTO (Amaya), Notice of Allowance and Notice of Allowability dated Feb. 14, 2013 issued in U.S. Appl. No. 12/721,770 (now allowed).

* cited by examiner

*Primary Examiner* — Rexford Barnie
*Assistant Examiner* — Toan Vu
(74) *Attorney, Agent, or Firm* — Fujitsu Patent Center (57) ABSTRACT

A wireless power apparatus includes: a power receiver coil which receives power, as magnetic field energy, from a power transmitter coil by magnetic field resonance produced between the power transmitter coil and the power receiver coil; a power pickup coil which derives power from the power receiver coil by electromagnetic induction; a detector which detects current flowing through the power pickup coil; and a controller which controls a coupling strength between the power pickup coil and the power receiver coil based on the current detected by the detector.

12 Claims, 7 Drawing Sheets

WIRELESS POWER APPARATUS AND WIRELESS POWER-RECEIVING METHOD

CROSS-REFERENCE TO RELATED APPLICATIONS

This application is based upon and claims the benefit of priority of the prior Japanese Patent Application No. 2009-85281, filed on Mar. 31, 2009, the entire contents of which are incorporated herein by reference.

FIELD

The present embodiment relates to a wireless power apparatus and a wireless power-receiving method.

BACKGROUND

As a method of transmitting electrical power (energy) in a wireless manner, the following methods may be mentioned: an electromagnetic induction method, a radio wave method, a magnetic field resonance method, and the like. Japanese Patent Application Publication No. 2009-501510 discusses a magnetic field resonance method in which electrical power is transmitted by use of magnetic field energy from a power transmitter coil to a power receiver coil between which a distance is provided.

SUMMARY

According to an aspect of the invention, a wireless power apparatus includes: a power receiver coil which receives power, as magnetic field energy, from a power transmitter coil by magnetic field resonance produced between the power transmitter coil and the power receiver coil; a power pickup coil which derives power from the power receiver coil by electromagnetic induction; a detector which detects current flowing through the power pickup coil; and a controller which controls a coupling strength between the power pickup coil and the power receiver coil based on the current detected by the detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A technique discussed in Japanese Patent Application Publication No. 2009-501510 has a disadvantage that electrical power transmission efficiency of a wireless electrical power apparatus, as a whole, degrades in response to changes in coupling strength (for example, a distance between coils) between a power transmitter coil and a power receiver coil.

In other words, an excessive decrease in the coupling strength between the power transmitter coil and the power receiver coil relative to the coupling strength between the power receiver coil and a power pickup coil causes a decrease in electrical power supplied to the power receiver coil from the power transmitter coil, so that an excessive decrease in the electrical power across the power receiver coil may be induced. On the other hand, an excessive increase in the coupling strength between the power transmitter coil and the power receiver coil relative to the coupling strength between the power receiver coil and the power pickup coil causes an excessive increase in the electrical power across the power receiver coil, so that a loss due to heat, produced by the power receiver coil, is induced.

According to a wireless electrical power apparatus and a wireless electrical power-receiving method disclosed in the present embodiment, electrical power transmission efficiency of a wireless electrical power apparatus as a whole is improved depending on changes in coupling strength between a power transmitter coil and a power receiver coil.

The wireless electrical power apparatus disclosed in the present embodiment is a wireless electrical power apparatus that includes a power receiver coil that receives electrical power, as magnetic field energy, from a power transmitter coil, by use of magnetic field resonance produced between the power transmitter coil and the power receiver coil, and a power pickup coil that derives electrical power from the power receiver coil by use of electromagnetic induction. The wireless electrical power apparatus further includes a detector that detects current flowing through the power pickup coil and a controller that controls coupling strength between the power pickup coil and the power receiver coil based on the current detected by the detector.

The wireless electrical power-receiving method disclosed in the present embodiment is a method of receiving electrical power in a wireless manner in which electrical power is derived, by use of electromagnetic induction, from the power receiver coil to the power pickup coil. This is achieved by supplying electrical power, as magnetic field energy, to the power receiver coil from the power transmitter coil, by use of the magnetic field resonance produced between the power transmitter coil and the power receiver coil. In the wireless electrical power-receiving method, the coupling strength between the power pickup coil and the power receiver coil is controlled based on amplitude of the current detected by the detector detecting the current flowing through the power derivation circuit.

According to the disclosure of the present embodiment, the power transmission efficiency of the apparatus as a whole is improved depending on the changes in coupling strength between the power transmitter coil and the power receiver coil.

BEST MODE OF CARRYING OUT THE INVENTION

In the wireless electrical power apparatus, the controller performs control so that an increase in current flowing through the power pickup coil causes an increase in coupling strength between the power pickup coil and the power receiver coil, and a decrease in the current flowing through the power pickup coil causes a decrease in the coupling strength between the power pickup coil and the power receiver coil. The coupling strength between the power receiver coil and the power pickup coil is increased in response to an increase in coupling strength between the power transmitter coil and the power receiver coil, and the coupling strength between the power receiver coil and the power pickup coil is decreased in response to a decrease in the coupling strength between the power transmitter coil and the power receiver coil. In consequence, degradation in electrical power transmission efficiency of the wireless electrical power apparatus as a whole resulting from an excessive increase and an excessive decrease in electrical power across the power receiver coil is effectively reduced if not prevented, according to the present embodiment.

The wireless electrical power apparatus further includes a driver capable of displacing the power pickup coil so that the coupling strength between the power receiver coil and the power pickup coil is changed. The controller controls the driver so that the power pickup coil is displaced based on a current detected by the detector.

In the wireless electrical power apparatus, the power pickup coil includes a plurality of coils, each of which has different coupling strength relative to the power receiver coil, and a switcher capable of selecting at least one of the plurality of coils. The controller performs switching control on the switcher based on the current detected by the detector.

The wireless electric power-receiving method is performed in the following manner. That is, an increase in current flowing through the power pickup coil causes an increase in coupling strength between the power pickup coil and the power receiver coil, and a decrease in the current flowing through the power pickup coil causes a decrease in the coupling strength between the power pickup coil and the power receiver coil. In response to an increase in coupling strength between the power transmitter coil and the power receiver coil, the coupling strength of the power receiver coil and the power pickup coil is increased, and in response to a decrease in the coupling strength between the power transmitter coil and the power receiver coil, the coupling strength of the power receiver coil and the power pickup coil is decreased. In consequence, degradation in electrical power transmission efficiency of the wireless electrical power apparatus as a whole resulting from an excessive increase and an excessive decrease in electrical power across the power receiver coil is effectively reduced (if not prevented), according to the present embodiment.

Displacing the power pickup coil allows the coupling strength between the power receiver coil and the power pickup coil to be changed in the wireless electrical power-receiving method.

Selecting at least one of a plurality of power pickup coils, each having a different coupling strength between the power receiver coil and the power pickup coil, allows the coupling strength between the power receiver coil and the power pickup coil to be changed in the wireless electrical power-receiving method.

Embodiment

1. Structure of Wireless Electrical Power Apparatus

As a method of a wireless electrical power apparatus, the following methods are mentioned: an electromagnetic induction method, a radio wave method, and a magnetic field resonance method. The electromagnetic induction method allows transmission of a large amount of electrical power, but on the other hand, the transmission distance thereof is short. The radio wave method allows long distance transmission, but on the other hand, the transmittable electrical power thereof is small. In the magnetic field resonance method, a long electrical power transmission distance may be achieved as compared with that of the electromagnetic induction method and a large amount of electrical power may be transmitted as compared with that of the radio wave method.

The magnetic field resonance method is achieved in the following manner. That is, a power transmitter coil and a power receiver coil, both having the same resonance frequency, are disposed at a certain distance, and current, having the same frequency as the resonance frequency, is caused to flow through the power transmitter coil. This produces an alternating magnetic field across the power transmission coil, so that a resonance phenomenon is induced between the power transmitter coil and the power receiver coil. Energy transfer efficiency between the power transmitter coil and the power receiver coil is improved by producing the resonance phenomenon. As a result thereof, electrical power is efficiently supplied to the power receiver coil from the power transmitter coil. The wireless electrical power apparatus that exploits the magnetic field resonance method achieves approximately several tens percent of power supply efficiency even in a case where the distance between the apparatuses is more than several tens of centimeters.

Note however that the description "the same resonance frequency" is not limited to cases where the resonance frequency is completely the same. It may occur that the resonance frequencies of a plurality of resonance circuits coincide with each other, in hypothetical cases, such as simulation or the like. However, it rarely occurs that the resonance frequencies of the plurality of resonance circuits coincide completely with each other in reality. For this reason, the description "the same resonance frequency" should be understood as "substantially the same." A range having substantially the same resonance frequency is determined by a Q-value. The higher the Q-value, the narrower the range having substantially the same resonance frequency becomes. The lower the Q-value, the wider the range having substantially the same resonance frequency becomes. A rough index of the range having substantially the same resonance frequency is, for example, a frequency range in which the value of a resonance point becomes a half-value thereof. In another index, the range having substantially the same resonance frequency is a frequency range that achieves target efficiency. In other words, the range having substantially the same resonance frequency is a frequency range that may achieve electrical power transmission with higher efficiency as compared with that achieved by electromagnetic induction, in a positional relationship where the coils are spaced to one another. Note that the range having substantially the same frequency is determined within the practice of those skilled in the art. However, it may frequently happen that engineers who do not have the practice of those skilled in the art reference the range. The above description is made in consideration of possible cases, and the scope of the present invention is not limited by the foregoing description.

To improve electrical power supply efficiency between a power transmitter coil and a power receiver coil, reducing electrical power loss and increasing coupling strength between the power transmitter coil and the power receiver coil is desirable. The reduction in electrical power loss may be achieved by effectively reducing if not suppressing internal loss and/or radiation loss of respective resonance coils. On the other hand, the coupling strength is greatly affected by shapes of the respective resonance coils and/or by a positional relationship of the two resonance coils. To position the two resonance coils, taking advantage of known mechanical guides, optical sensors or the like may be used. However, these techniques are indirect techniques in terms of effectively improving the coupling strength, and it is difficult to achieve proper positioning operations thereof with these techniques.

Figure 1:
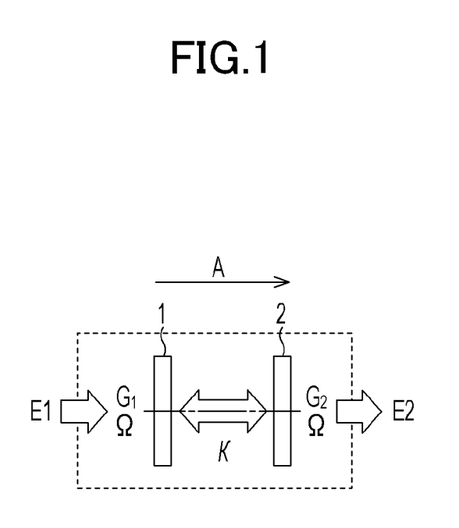
FIG. 1 illustrates a schematic view indicating a basic concept of a wireless electrical power apparatus.

FIG. 1 illustrates a schematic view indicating a basic concept of a wireless electrical power apparatus.

A power transmitter coil 1 is a coil and the both ends of the coil are non-connected. No electrical circuit is electrically connected to the power transmitter coil 1 to increase the Q-value. The power transmitter coil 1 includes a capacitor with stray capacitance. This allows the power-transmitting circuit 1 to serve as an LC resonance circuit. Note that the capacitor is not limited to a stray capacitance, and it is also possible to achieve the LC resonance circuit by electrically connecting both ends of a coil with a capacitor. The Q-value that indicates sharpness of resonance is determined by pure resistance and radiation resistance of the coil. The smaller the values thereof the greater the Q-value. In addition, it is possible to obtain a resonance frequency f from an inductance L and a capacitance C of the capacitor, for example, based on the following Equation 1:

$$f = \frac{1}{2\pi\sqrt{LC}}$$ [Equation 1]

Electrical power is supplied to the power transmitter coil 1 from a power supply coil (not shown) by use of electromagnetic induction. The power transmitter coil 1 and the power supply coil are disposed at a short distance so that the electrical power may be supplied by use of the electromagnetic induction. An influence, exerted by an oscillation circuit electrically connected to the power supply coil, on a resonance characteristic of the power supply coil may be reduced by virtue of wireless connection between the power transmitter coil 1 and the power supply coil by use of the electromagnetic induction. In consequence, this makes it possible to achieve greater flexibility in designing the oscillation circuit. The power supply coil is electrically connected to an electrical power supply (not shown) through the oscillation circuit via a cable, and an alternating current with the resonance frequency is supplied to the power supply coil from the oscillation circuit. Inputting current (energy E1), having the same resonance frequency as resonance frequencies of the power transmitter coil 1 and a power receiver coil 2 to the power transmitter coil 1, produces a magnetic field around the power transmitter coil 1, so that a resonance phenomenon is induced between the power transmitter coil 1 and the power receiver coil 2. This allows electrical power to be supplied from the power transmitter coil 1 to the power receiver coil 2. The power receiver coil 2 supplies a load with the electrical power (energy E2) supplied from the power transmitter coil 1.

The power receiver coil 2 is a coil and both ends of the coil are open. No electric circuit is electrically connected to the power receiver coil 2 to increase the Q-value in the same manner as the power transmitter coil 1. The power receiver coil 2 serves as the LC resonance circuit in the same manner as the power transmitter coil 1. By electromagnetic induction, electrical power is derived from the power receiver coil 2 by using a power pickup coil (not shown). The power receiver coil 2 and the power pickup coil are disposed at a short distance so that the electrical power may be derived by use of the electromagnetic induction. The power pickup coil is electrically connected to a load that consumes the electrical power. An output circuit that derives electrical power and converts the electric power to the electrical power consumed by the load is electrically connected between the power pickup coil and the load. The output circuit is a circuit that converts the voltage to a voltage capable of being applied to the load. The output circuit is, for example, a transformer or an AC-DC converter. The power receiver coil 2 has the same structure as the power transmitter coil 1 and includes a coil part and a capacitor. The resonance frequency of the power receiver coil 2 coincides with the resonance frequency f of the power transmitter coil 1. The power receiver coil 2 disclosed above produces a magnetic field resonance mode by synchronization between the resonance frequency thereof and the resonance frequency of the power transmitter coil 1 that is disposed at a short distance therefrom. Electrical power from the power transmitter coil 1 is supplied, in a wireless manner, to the power receiver coil 2. The electrical power supplied to the power receiver coil 2 is further supplied, in a wired manner, to the load via, for example, the power derivation coil and a rectifier circuit.

When electrical power is transmitted between the power transmitter coil 1 and the power receiver coil 2, electrical power transmission efficiency thereof depends on a performance index represented by the following Equation 2:

$$\text{Performance index} = \frac{\kappa}{\sqrt{G1 \cdot G2}}$$ [Equation 2]

where κ represents the amount of energy flow per unit time (coupling strength between resonance coils), G1 represents the amount of energy loss by the power transmitter coil 1 per unit time, and G2 represents the amount of energy loss by the power receiver coil 2 per unit time.

According to Equation 2, to improve energy transfer efficiency between the power transmitter coil 1 and the power receiver coil 2, the energy loss G1 and the energy loss G2 is decreased and the coupling strength κ is increased. The decrease in energy losses G1 and G2 is achieved by effectively reducing if not suppressing internal loss and/or radiation loss of the power transmitter coil 1 and of the power receiver coil 2. On the other hand, the coupling strength κ is greatly affected by shapes of the power transmitter coil 1 and the power receiver coil 2 and/or by a positional relationship of the power transmitter coil 1 and the power receiver coil 2. That is to say, the larger the distance between the coils the smaller the coupling strength κ becomes, and the smaller the distance between the coils the greater the coupling strength κ becomes. In addition, the coupling strength κ varies even with displacement of the relative position of both coils in a crossing direction relative to an electrical power transmission direction A (a so-called "axis displacement").

Figure 2:
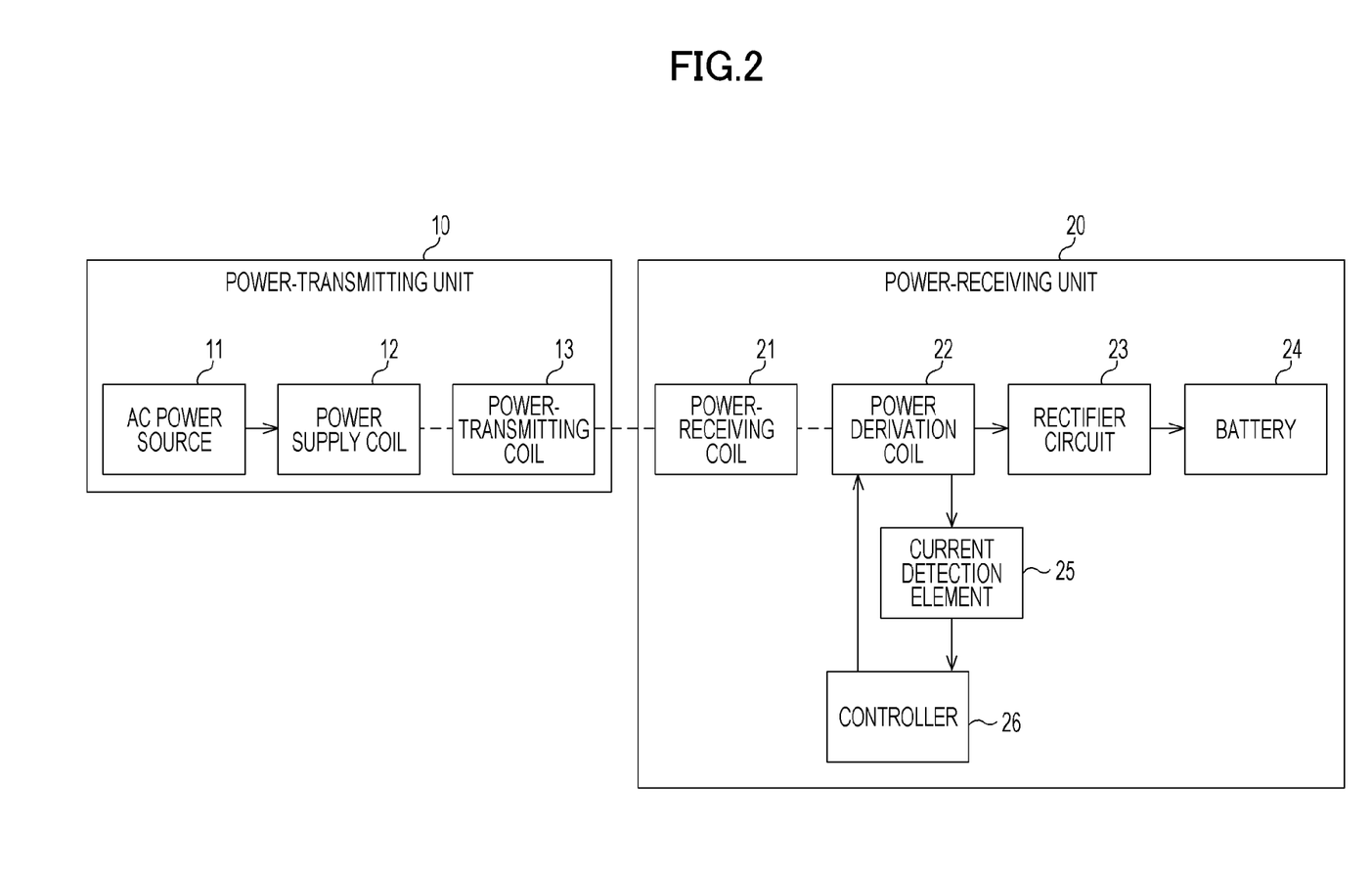
FIG. 2 illustrates a block diagram of the wireless electrical power apparatus.

FIG. 2 illustrates a block diagram of a charging system that is one example of the wireless electrical power apparatus in which the magnetic field resonance method disclosed above is employed. Note that a dashed line in FIG. 2 indicates wireless connection. The wireless electrical power apparatus illustrated in FIG. 2 includes a power-transmitting unit 10 and a power-receiving unit 20.

The power-transmitting unit 10 includes an alternating current (AC) power source 11, a power supply coil 12, and a power transmitter coil 13. Electrical power is supplied to the power transmitter coil 13 from the power supply coil 12 by electromagnetic induction. The power transmitter coil 13 and the power supply coil 12 are disposed a short distance away from each other so that the electrical power may be supplied by the electromagnetic induction. An influence, exerted by an oscillation circuit (not shown) electrically connected to the power supply coil 12, on a resonance frequency of the power supply coil 12 may be reduced by virtue of the wireless connection between the power transmitter coil 13 and the power supply coil 12 by the electromagnetic induction. In consequence, this makes it possible to achieve greater flexibility in designing the oscillation circuit. The power supply coil 12 is connected, in a wired manner, to the oscillation circuit included in the AC power source 11, and an alternating current with a resonance frequency causing the power transmitter coil 13 to resonate is supplied from the oscillation coil to the power supply coil 12. Inputting current, having the same resonance frequency as the resonance frequency of the power transmitter coil 13 and a resonance frequency of a power receiver coil 21, to the power transmitter coil 13 produces a magnetic field around the power transmitter coil 13, so that a resonance phenomenon is induced between the power transmitter coil 13 and the power receiver coil 21. This allows electrical power, as magnetic field energy, to be supplied from the power transmitter coil 13 to the power receiver coil 21. Note that if a resonance relationship is not formed between the power supply coil 12 and the power transmitter coil 13, resonance between the power transmitter coil 13 and the power receiver coil 21 is not interfered therewith (in other words, no influence is exerted thereon). Hence it is preferable that both coils 12 and 13 are not in the resonance relationship.

The power-receiving unit 20 includes the power receiver coil 21, a power pickup coil 22, a rectifier circuit 23, a battery 24, a current detection element 25, and a controller 26. The power receiver coil 21 has the same resonance frequency as the power transmitter coil 13. The power receiver coil 21 receives the electrical power through the magnetic field energy produced between the power receiver coil 21 and the power transmitter coil 13. The power receiver coil 21 and the power pickup coil 22 are disposed at a short distance away from each other so that the electrical power may be derived by use of electromagnetic induction. The power pickup coil 22 is electrically connected to the battery 24 through the rectifier circuit 23. The battery 24 is a rechargeable battery and is an example of the load. The current detection element 25 is an example of the detector. The current detection element 25 is disposed adjacent to the power pickup coil 22. The current detection element 25 detects current flowing through the power pickup coil 22. The current detection element 25 may be a Hall sensor that detects magnetic field energy produced, for example, with the current flowing through the power transmitter coil 13 and converts the detected magnetic field energy to a current waveform, so that the current waveform is output. The current detection element 25 outputs the waveform of the detected current to the controller 26. The controller 26 measures amplitude of the current based on the current waveform sent from the current detection element 25. The controller 26 variably controls coupling strength between the power receiver coil 21 and the power pickup coil 22 based on the measured amplitude. An example of the controller 26 will be disclosed below.

Figure 3:
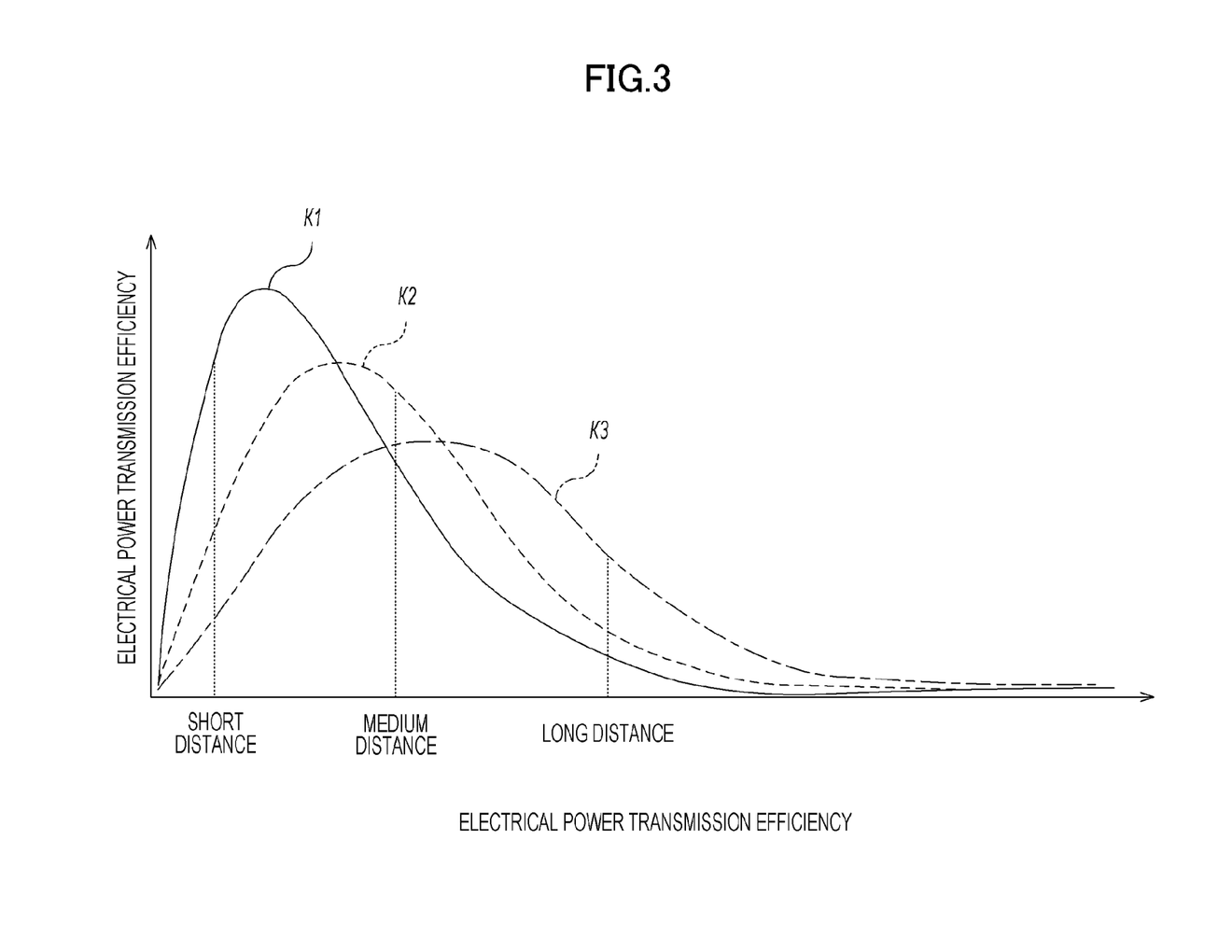
FIG. 3 is a graph indicating relationships among transmission distances between resonance coils, coupling strength between a power receiver coil and a power pickup coil, and electrical power transmission efficiency.

FIG. 3 is a graph indicating relationships among electrical power transmission distances between the resonance coils (that is, the power transmitter coil 13 and the power receiver coil 21), the coupling strength between the power receiver coil 21 and the power pickup coil 22, and degrees of the electrical power transmission efficiency of the wireless electrical power apparatus. In FIG. 3, a characteristic represented by a solid line κ1 indicates a power transmission efficiency characteristic where the power receiver coil 21 and the power pickup coil 22 are in a "strongly-coupled state." A characteristic represented by a dashed line κ2 indicates another power transmission efficiency characteristic where the power receiver coil 21 and the power pickup coil 22 are in a "moderately-coupled state." A characteristic represented by a dashed-dotted line κ3 indicates yet another power transmission efficiency characteristic where the power receiver coil 21 and the power pickup coil 22 are in a "weakly-coupled state."

Note that the "strongly-coupled state" indicates, for example, a case where k/G indicating a relationship of the coupling strength κ between the power transmitter coil 13 and the power receiver coil 21 and the energy loss G is greater than one (1). The "moderately-coupled state" indicates, for example, a case where the k/G is approximately equal to one (1). The "weakly-coupled state" indicates, for example, a case where the k/G is less than one (1). Note that definitions of these coupling states are merely examples. In addition, the "electrical power transmission distances between the resonance coils" in FIG. 3 are the examples of the coupling strength between the power transmitter coil 13 and the power receiver coil 21. Other than the electrical power transmission distances disclosed above, postures (angles) or the like of the power transmitter coil 13 and the power receiver coil 21 affects the coupling strength thereof. Moreover, the "electrical power transmission efficiency" indicates the amount of electrical power consumed between the AC power source 11 and the battery 24 (load).

As indicated in FIG. 3, when the electrical power transmission distance between the power transmitter coil 13 and the power receiver coil 21 is short (that is, the strongly-coupled state between the power transmitter coil 13 and the power receiver coil 21), strengthening the coupling between the power receiver coil 21 and the power pickup coil 22, as indicated by the characteristic κ1, results in improved electrical power transmission efficiency of the system as a whole. That is to say, more electrical power is transmitted from the power transmitter coil 13 to the power receiver coil 21 in the strongly-coupled state between the power transmitter coil 13 and the power receiver coil 21. The weakly-coupled state between the power receiver coil 21 and the power pickup coil 22 results in a decrease in the amount of electrical power derived, by the power pickup coil 22, from the power receiver coil 21. The decrease in the amount of electrical power derived from the power receiver coil 21 causes an increase in the electrical power across the power receiver coil 21, so that loss due to heat may occur. To address this problem, the strongly-coupled state between the power receiver coil 21 and the power pickup coil 22 is provided in the period where the strongly-coupled state between the power transmitter coil 13 and the power receiver coil 21 is provided, in the present embodiment. This allows for a greater amount of electrical power to be derived, by the power pickup coil 22, from the power receiver coil 21, so that the loss due to the heat across the power receiver coil 21 is effectively reduced if not suppressed. In consequence, the electrical power transmission efficiency of the system as a whole is improved.

On the other hand, when the electrical power transmission distance between the power transmitter coil 13 and the power receiver coil 21 is long (that is, the weakly-coupled state between the power transmitter coil 13 and the power receiver coil 21), weakening the coupling between the power receiver coil 21 and the power pickup coil 22, as indicated by the characteristic κ3, results in the improved electrical power transmission efficiency of the wireless electrical power apparatus as a whole. That is to say, less electrical power is transmitted from the power transmitter coil 13 to the power receiver coil 21 in the weakly-coupled state between the power transmitter coil 13 and the power receiver coil 21. When the strongly-coupled state between the power receiver coil 21 and the power pickup coil 22 is provided in the above state, the amount of electrical power stored across the power receiver coil 21 may become excessively low. This causes degradation in electrical power transmission efficiency of the wireless electrical power apparatus as a whole. To address this problem, the weakly-coupled state between the power receiver coil 21 and the power pickup coil 22 is provided in the period where the weakly-coupled state between the power transmitter coil 13 and the power receiver coil 21 is provided, in the present embodiment. This allows for the amount of electrical power to be derived from the power receiver coil 21 by the power pickup coil 22 to become less, so that the excessive decrease in electrical power across the power receiver coil 21 is effectively reduced if not prevented. In consequence, the electrical power transmission efficiency of the wireless electrical power apparatus as a whole is improved.

As disclosed hereinabove, it is preferable to change the coupling strength between the power receiver coil 21 and the power pickup coil 22 in carrying out the electrical power transmission between the power-transmitting unit 10 and the power-receiving unit 20 by using the magnetic field resonance method. Changing the coupling strength between the power receiver coil 21 and the power pickup coil 22 depending on the coupling strength (for example, the distances) between the power transmitter coil 13 and the power receiver coil 21 makes it possible to improve the electrical power transmission efficiency of the wireless electrical power apparatus as a whole. Note that the coupling strength between the power transmitter coil 13 and the power receiver coil 21 varies not only depending on distances between the power transmitter coil 13 and the power receiver coil 21, but also depending on installation postures, installation angles, or the like of the power-transmitting unit 10 and/or the power-receiving unit 20. The description that the coupling strength between the coils changes depending on the distance is made in the present embodiment.

Figure 4A:
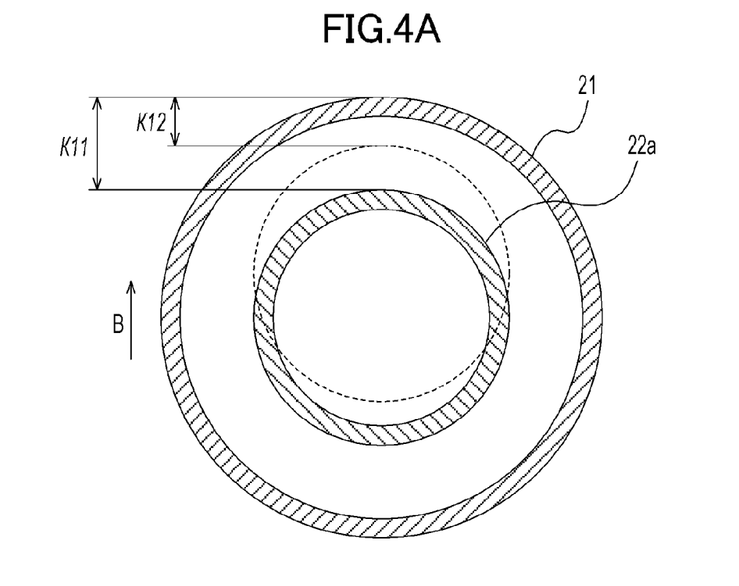
FIG. 4A illustrates a sectional view of a power-receiving-unit-side coil that includes a power pickup coil capable of being displaced.
Figure 4B:
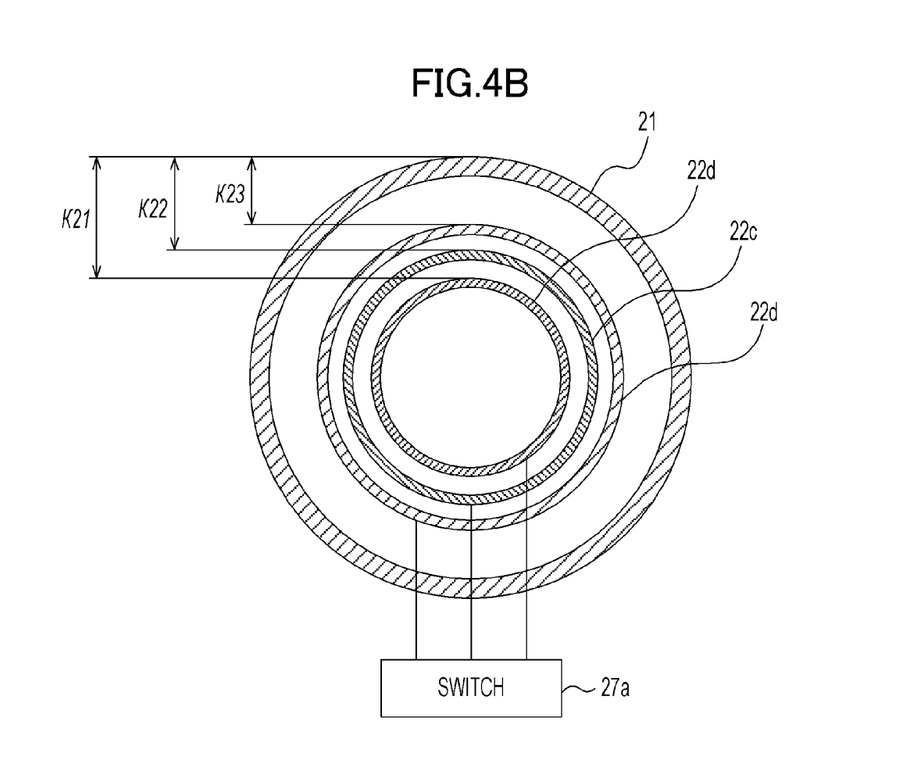
FIG. 4B illustrates a sectional view of another power-receiving unit-side coil that includes a plurality of power pickup coils.
Figure 4C:
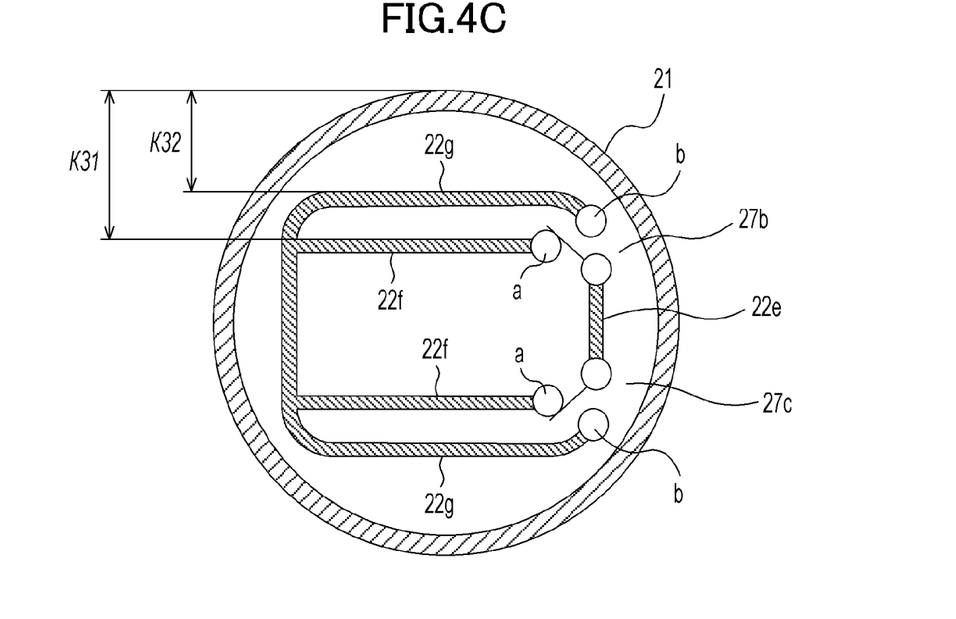
FIG. 4C illustrates a sectional view of yet another power-receiving-unit-side coil that includes a plurality of power pickup coils.
Figure 4D:
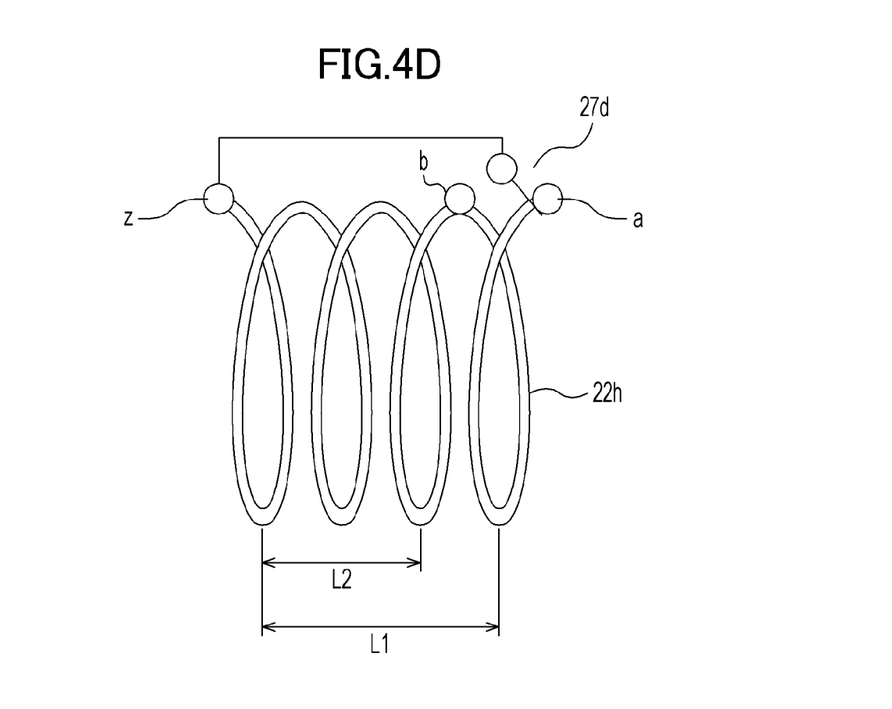
FIG. 4D illustrates a sectional view of a power pickup coil in which the number of windings is capable of being changed.

FIGS. 4A through 4D illustrate examples for changing the coupling strength between the power receiver coil and the power pickup coil. FIGS. 4A through 4C illustrate sectional views of the power receiver coils and the power pickup coils. FIG. 4D illustrates a schematic view of the power pickup coil. Although the power receiver coils in FIGS. 4A through 4C and the power pickup coils in FIGS. 4A and 4B may be spirally winded in practice, the sectional views are simplified here.

FIG. 4A illustrates a structure in which a power pickup coil 22a is disposed inside the power receiver coil 21. The power pickup coil 22a is capable of being displaced in a direction indicated, for example, by the arrow B from a position illustrated in FIG. 4A (that is, the position indicated by the solid line) by using a driver, such as a motor or the like. The dash-line circle illustrated in FIG. 4A is an example indicating a position when the power pickup coil 22a is displaced in the direction indicated by the arrow B from the position indicated by the solid line. The power pickup coil 22a that is displaceable in the direction indicated by the arrow B allows a gap between the power receiver coil 21 and the power pickup coil 22a to be changed. Changing the gap between the power receiver coil 21 and the power pickup coil 22a makes it possible to change the coupling strength between the power receiver coil 21 and the power pickup coil 22a. For example, assume that the coupling strength between the power receiver coil 21 and the power pickup coil 22a is "κ11" when the power pickup coil 22a is placed at the position of solid line in FIG. 4A, and the coupling strength between the power receiver coil 21 and the power pickup coil 22a is "κ12" when the power pickup coil 22a is placed at the position of dash-line circle in FIG. 4A. In the above example, the coupling strength "κ12" is higher than the coupling strength "κ11."

Note that the power pickup coil 22a illustrated in FIG. 4A includes a mechanism capable of being displaced in a step-wise manner or in a gradual manner between a coaxial position relative to the power receiver coil 21 (that is, the position indicated by the solid line) and the position indicated by the dash-line circle. The coupling strength between the power supply coil 21 and the power pickup coil 22a may be set in detail by making the position of the power pickup coil 22 changeable in a stepwise manner or in a gradual manner. Moreover, the displacing direction of the power pickup coil 22a is not limited to the direction indicated by the arrow B. Any direction at least capable of changing the gap between the power receiver coil 21 and the power pickup coil 22a is allowable. It is preferable that the displacing direction of the power pickup coil 22a be directions which are substantially orthogonal to the center axis of the power receiver coil 21.

FIG. 4B illustrates another structure in which a plurality of power pickup coils 22b, 22c, and 22d are disposed inside the power-receiving circuit 21. The power receiver coil 21 and the plurality of power pickup coils 22b, 22c, and 22d are disposed in a coaxial manner. The power pickup coil 22c is disposed inside the power pickup coil 22b. The power pickup coil 22d is disposed inside the power pickup coil 22c. In consequence, the distance between the power receiver coil 21 and the power pickup coil 22b is the shortest, and the distance between the power receiver coil 21 and the power pickup coil 22d is the longest. A switch 27a is electrically connected to the respective power pickup coils 22b through 22d. The switch 27a is an example of the switcher. The switch 27a switches the power pickup coils 22b through 22d so that at least one of the power pickup coils 22b through 22d is caused to exhibit a conductive state. Switching control of the switch 27a is performed by the controller 26 (see FIG. 2). In FIG. 4B, assume that the coupling strength between the power receiver coil 21 and the power pickup coil 22d is "κ21" when the power pickup coil 22d is caused to exhibit the conductive state, the coupling strength between the power receiver coil 21 and the power pickup coil 22c is "κ22" when the power pickup coil 22c is caused to exhibit the conductive state, and the coupling strength between the power receiver coil 21 and the power pickup coil 22b is "κ23" when the power pickup coil 22b is caused to exhibit the conductive state. In the above example, the coupling strength is represented as follows: κ21 <κ22 <κ23

Note that although there are three (3) power pickup coils in FIG. 4B, any structure is allowed as long as at least a plurality of power pickup coils is disposed in a coaxial manner and a conductive state is capable of being changed by using a switch.

A power pickup coil 22e, the sectional shape of which is substantially rectangle, is disposed inside the power receiver coil 21, in FIG. 4C. The power pickup coil 22e includes inside-coil portions 22f and outside-coil portions 22g. One end of each of the inside-coil portions 22f and one end of each of the outside-coil portions 22g are electrically connected to one another. The other end of each of the inside-coil portions 22f and the other end of each of the outside-coil portions 22g are capable of being electrically connected or disconnected by use of a switch 27b and a switch 27c. The switch 27b and the switch 27c are an example of the switcher. The inside-coil portions 22f are each disposed inside the outside-coil portions 22g. Electrical connection of the switch 27b and the switch 27c with terminals "a" causes the inside-coil portions 22f to exhibit a conductive state. In response to the conductive state of the inside-coil portions 22f, coupling strength between the power receiver coil 21 and the power pickup coil 22e is represented as κ31. Electrical connection of the switch 27b and the switch 27c with terminals "b" causes the outside-coil portions 22g to exhibit the conductive state. In response to the conductive state of the outside-coil portions 22g, coupling strength between the power receiver coil 21 and the power pickup coil 22e is represented as κ32. The coupling strength κ32 is higher than the coupling strength κ31. Note that although the power pickup coil 22e illustrated in FIG. 4C includes two (2) coil portions (that is, the inside-coil portions 22f and the outside-coil portions 22g), as many as three (3) or more coil portions, each having different coupling strength relative to the power receiver coil 21, may be disposed and a conductive state may be selectively achieved by using the switch 27b and the switch 27c.

In FIG. 4D, a spiral-shaped power pickup coil 22h includes a terminal "a" and a terminal "z" on each end thereof. The spiral-shaped power pickup coil 22h includes a terminal "b" that is disposed between the terminals "a" and "z." The terminal "a" and the terminal "b" selectively exhibit a conductive state by a switch 27d. The switch 27d is an example of the switcher. Electrical connection of the switch 27d with the terminal "a" side causes the power pickup coil 22h as a whole to exhibit a conductive state. At this point in time, the inductance thereof is L1. Electrical connection of the switch 27d with the terminal "b" causes a portion between the terminal "b" and the terminal "z" of the power pickup coil 22h to exhibit a conductive state. At this point in time, the inductance thereof is L2. In this way, since the inductance of the power pickup coil 22h is changed by switching the switch 27d, change in coupling strength between the power pickup coil 22h and the power receiver coil 21 is achieved. When the number of windings of the power receiver coil 21, the shape thereof, and the positional relationship thereof are constant, the change in the coupling strength between the power receiver coil 21 and the power pickup coil 22h is achieved by changing the inductance of the power pickup coil 22h.

Figure 5A:
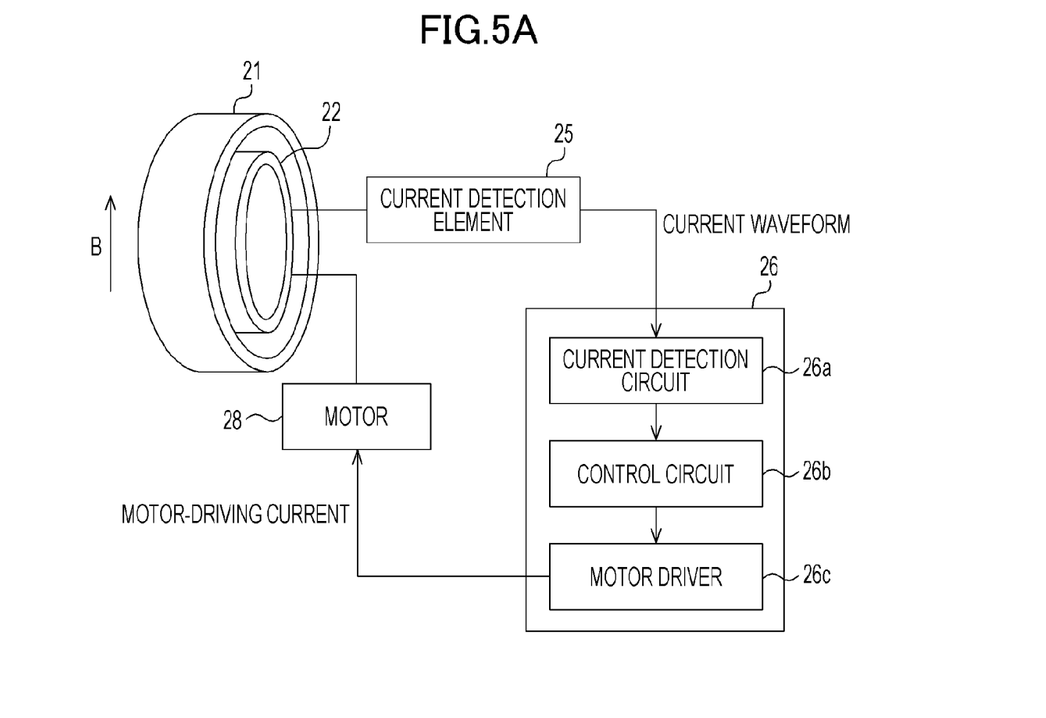
FIG. 5A illustrates a block diagram indicating one example of a controller.

FIG. 5A illustrates an example of the controller 26. The controller 26 illustrated in FIG. 5A is disposed on the power-receiving unit 20 that includes the power pickup coil 22a illustrated in FIG. 4A. The controller 26 in FIG. 5A includes a current detection circuit 26a, a control circuit 26b, and a motor driver 26c. The current detection circuit 26a measures the current amplitude based on the current waveform sent from the current detection element 25. The current amplitude is sent to the control circuit 26b. The control circuit 26b stores the current amplitude sent from the current detection circuit 26a and compares a current amplitude most recently measured with a current amplitude previously measured. When the control circuit 26b makes a determination that it is desirable to displace the power pickup coil 22, as a result of the comparison of the current amplitude, the control circuit 26b sends a control signal to the motor driver 26c. The motor driver 26c sends a motor-driving current to a motor 28 based on the control signal sent from the control circuit 26b. The motor 28 operates according to the motor-driving current sent from the motor driver 26c and displaces the power pickup coil 22 in the direction indicated by the arrow B or in a direction opposite thereto.

Figure 5B:
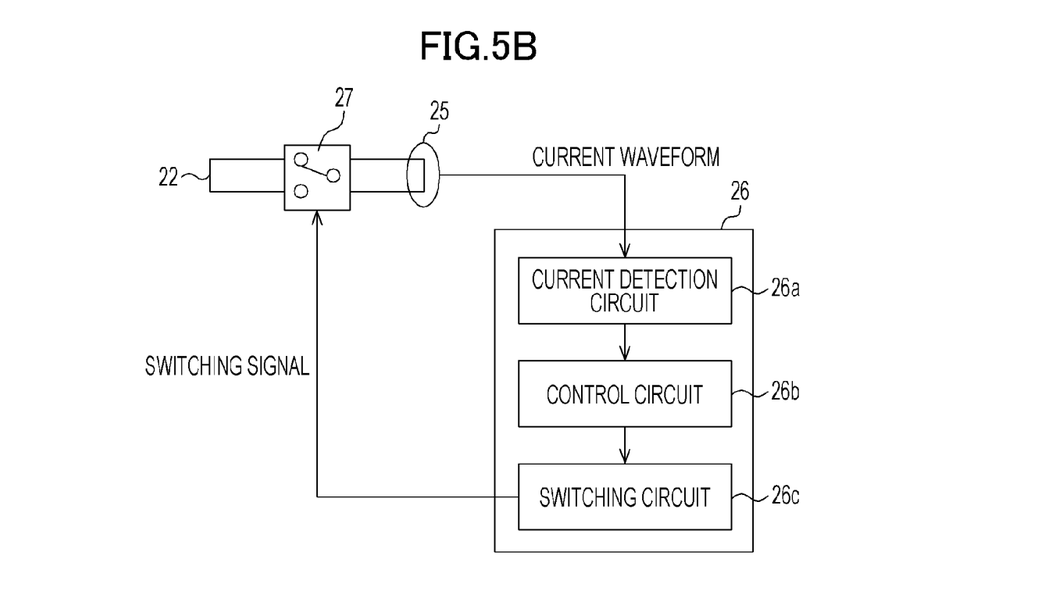
FIG. 5B illustrates a block diagram indicating another example of the controller.

FIG. 5B illustrates another example of the controller 26. The controller 26 illustrated in FIG. 5B is disposed on the power-receiving unit 20 that includes the power pickup coils illustrated in FIGS. 4B through 4D. The controller 26 in FIG. 5B includes the current detection circuit 26a, the control circuit 26b, and a switching circuit 26d. The current detection circuit 26a measures the current amplitude, based on the current waveform sent from the current detection element 25. The current amplitude is sent to the control circuit 26b. The control circuit 26b stores the current amplitude sent from the current detection circuit 26a and compares the current amplitude most recently measured and the current amplitude previously measured. When the controller 26b makes a determination that it is desirable to displace the power pickup coil 22 as a result of the comparison of the current amplitude, the control circuit 26b sends the control signal to the switching circuit 26d. The switching circuit 26d switches to control the switch 27 based on the control signal sent from the control circuit 26b.

2. Operation of Wireless Electrical Power Apparatus

Current output from the AC power source 11 is input to the power supply coil 12 in the wireless electrical power apparatus illustrated in FIG. 2. The power supply coil 12 produces an electromagnetic field based on the current input thereto and supplies the power transmitter coil 13 with electrical power by the electromagnetic energy. Supplying the power transmitter coil 13 with the electric power produces the magnetic field between the power transmitter coil 13 and the power receiver coil 21. Since the power transmitter coil 13 and the power receiver coil 21 have the same resonance frequencies, magnetic field resonance is produced therebetween. This makes it possible to supply the electrical power to the power receiver coil 21 from the power transmitter coil 21.

The power pickup coil 22 derives the electrical power from the power receiver coil 21 by use of electromagnetic induction. The electrical power derived by the power pickup coil 22 is supplied to a load, such as, the battery 24 or the like, through the rectifier circuit 23.

Here, since the power-transmitting unit 10 and the power-receiving unit 20 are disposed apart from each other, the relative position thereof may be varied. The variation in the relative positions of the power-transmitting unit 10 and the power-receiving unit 20 induces the change in coupling strength between the power transmitter coil 13 and the power receiver coil 21. This change in coupling strength between the power transmitter coil 13 and the power receiver coil 21 causes, as illustrated in FIG. 3, the change in electrical power transmission efficiency of the wireless electrical power apparatus as a whole.

For example, when the coupling strength between the power transmitter coil 13 and the power receiver coil 21 changes to the strongly-coupled state (corresponding to a short distance in FIG. 3) from the moderately-coupled state (corresponding to a medium distance in FIG. 3) in the moderately-coupled state between the power receiver coil 21 and the power pickup coil 22, significant degradation in the electrical power transmission efficiency may result. This is because the electrical power stored across the power receiver coil 21 becomes greater than the electrical power derived from the power receiver coil 21 by the power pickup coil 22, and this results in the loss due to the heat across the power receiver coil 21. On the other hand, when the coupling strength between the power transmitter coil 13 and the power receiver coil 21 changes to the weakly-coupled state (corresponding to a long distance in FIG. 3) from the moderately-coupled state, this also results in the significant degradation in the electrical power transmission efficiency. This is because the electrical power derived from the power receiver coil 21 by the power pickup coil 22 becomes greater than the electrical power stored across the power receiver coil 21, and this results in a decrease in the electrical power across the power receiver coil 21. As disclosed above, when the change in coupling strength between the power transmitter coil 13 and the power receiver coil 21 occurs in a condition where the coupling strength between the power receiver coil 21 and the power pickup coil 22 is constant, this results in the degradation in electrical power transmission efficiency of the wireless electrical power apparatus as a whole.

To address this problem, the current flowing through the power pickup coil 22 is detected and the coupling strength between the power receiver coil 21 and the power pickup coil 22 is changed in response to the current amplitude thereof in the present embodiment. In other words, the coupling strength between the power receiver coil 21 and the power pickup coil 22 is changed depending on the coupling strength between the power transmitter coil 13 and the power receiver coil 21.

Figure 6:
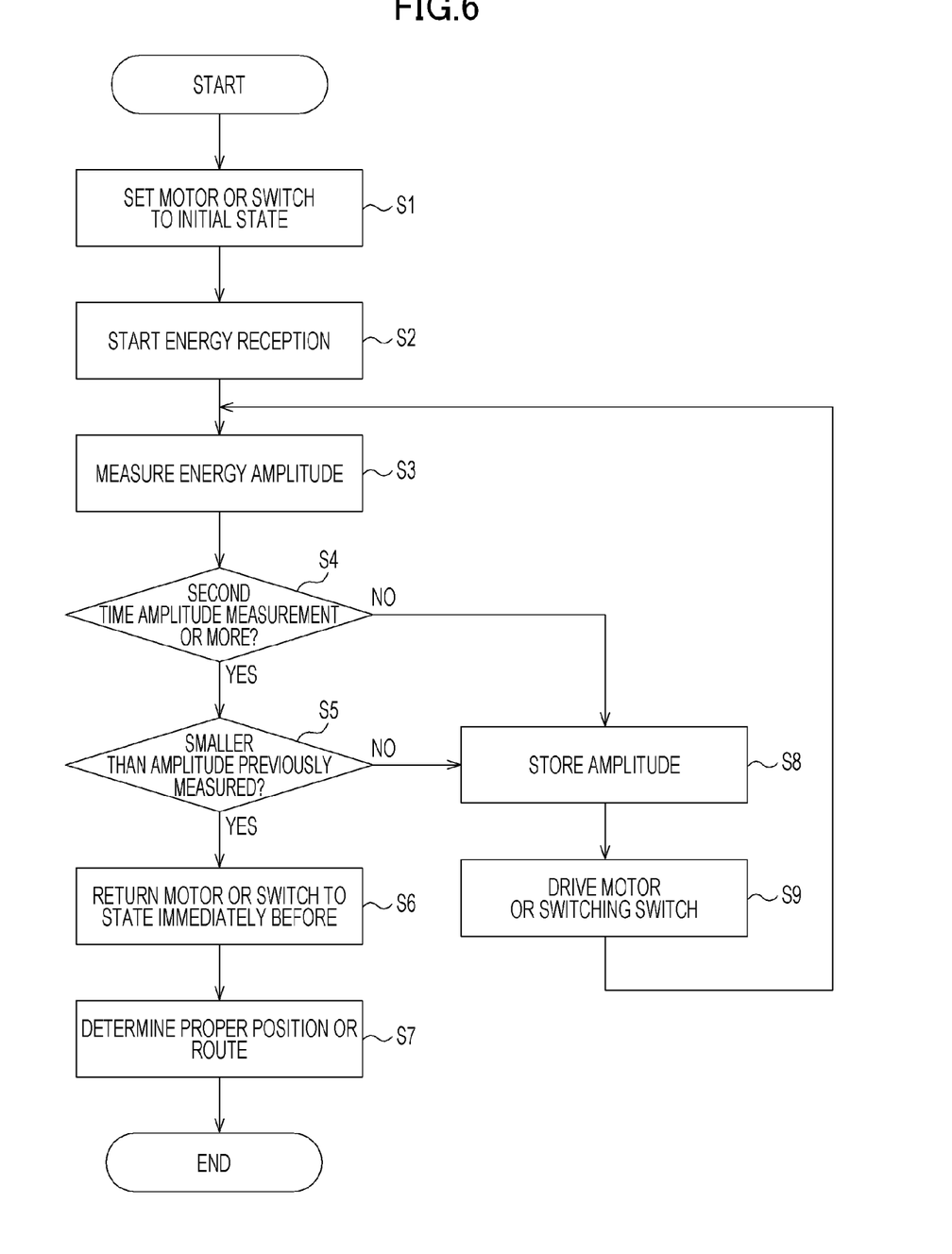
FIG. 6 is a flowchart indicating operations when electric power is supplied.

FIG. 6 illustrates a control flow of the wireless electrical power apparatus. Note that although any one of the structures illustrated in FIGS. 5A and 5B may be considered as the controller 26, it is assumed that the power-receiving unit 20 includes the controller 26 illustrated in FIG. 5A, in the description hereinafter disclosed.

First, the controller 26 sends the motor-driving current to the motor 28 and controls the power pickup coil 22 so that the power pickup coil 22 is placed at an initial position before electrical power is supplied to the power-receiving unit 20 from the power-transmitting unit 10. The initial position of the power pickup coil 22 is, for example, the position indicated by the solid line in FIG. 4A (S1).

Next, the electrical power is supplied to the power-receiving unit 20 from the power-transmitting unit 10. The operation of supplying the electrical power is omitted because it has been disclosed above. The electrical power supplied to the power receiver coil 21 is supplied to the power pickup coil 22 by use of electromagnetic induction. The electrical power supplied to the power pickup coil 22 is supplied to the battery 25 through the rectifier circuit 24 (S2).

The current detection element 25 detects the current flowing through the power pickup coil 22 and sends the current waveform to the current detection circuit 26a. The current detection circuit 26a measures the current amplitude, based on the current waveform sent from the current detection element 25. The current detection circuit 26a sends the measured amplitude to the control circuit 26b (S3).

Thereafter, the control circuit 26b counts the number of times of current measurement performed by the current detection circuit 26a (S4). When the most recent measurement of current is a first time measurement (NO in S4), the control circuit 26b stores the measured amplitude (S8) and outputs the control signal to the motor driver 26c. The motor driver 26c sends the motor-driving current to the motor 28, based on the control signal sent from the control circuit 26b. The motor 28 operates according to the motor-driving current sent from the motor driver 26c and displaces the current pickup coil 22 (for example, the current pickup coil 22a in FIG. 4A) in the direction indicated by the arrow B. This allows the coupling strength between the power receiver coil 21 and the power pickup coil 22 to be increased. Note that it is preferable that the control circuit 26b hold a degree of displacement of the power pickup coil 22, in the form of a table that includes the current amplitude and the degree of displacement.

Next, the current detection circuit 26a again obtains the current waveform from the current detection element 25 and outputs the current amplitude to the control circuit 26b (S3).

The control circuit 26b makes a determination that the number of times of the current measurement performed by the current detection circuit 26a is a second time measurement (YES in S4), and the control circuit 26b compares the current amplitude most recently measured with the current amplitude previously measured (S5). When the control circuit 26b makes a determination that the current amplitude most recently measured is equal to or greater than the current amplitude previously measured (NO in S5), the control circuit 26b stores the current amplitude most recently measured (S8) and thereafter executes processing that has been executed in the above operations. On the other hand, when the control circuit 26b makes a determination that the current amplitude most recently measured is smaller than the current amplitude previously measured (YES in S5), the control circuit 26b controls the power pickup coil 22 so that the power pickup coil 22 returns to a state immediately before. For example, the control to return the power pickup coil 22, having been displaced in the direction indicated by the arrow B in S9, to the initial position is performed (S6). That is to say, since the amplitude of the current flowing through the current pickup coil 22 becomes greater in response to the increase in the coupling strength between the power transmitter coil 13 and the power receiver coil 21 (NO in S5), the coupling strength between the power receiver coil 21 and the power pickup coil 22 is increased, in this case. On the other hand, since the amplitude of the current flowing through the current pickup coil 22 becomes smaller in response to the decrease in the coupling strength between the power transmitter coil 13 and the power receiver coil 21 (YES in S5), the coupling strength between the power receiver coil 21 and the power pickup coil 22 is decreased.

As disclosed above, a proper position of the power pickup coil 22 is determined (S7). This makes it possible to specify the coupling strength between the power receiver coil 21 and the power pickup coil 22 that is desirable for the coupling strength between the power transmitter coil 13 and the power receiver coil 21, so that the electrical power is supplied to the load.

3. Advantages of the Present Embodiment and so on

The wireless electrical power apparatus according to the present embodiment changes the coupling states between the power receiver coil 21 and the power pickup coil 22 depending on the coupling states between the power transmitter coil 13 and the power receiver coil 21. In other words, when the strongly-coupled state is provided between the power transmitter coil 13 and the power receiver coil 21, the strongly-coupled state is achieved between the power receiver coil 21 and the power pickup coil 22. On the other hand, when the weakly-coupled state is provided between the power transmitter coil 13 and the power receiver coil 21, the weakly-coupled state is achieved between the power receiver coil 21 and the power pickup coil 22. The above-disclosed structure makes it possible to effectively reduce if not suppress an excessive decrease in electrical power supplied to the power pickup coil 22 from the power receiver coil 21 and heat loss across the power receiver coil 21. In consequence, desirable electrical power transmission efficiency of the wireless electrical power apparatus as a whole is achieved.

Note that the wireless electrical power apparatus according to the present embodiment is advantageous to a recharger for apparatuses that operate with a rechargeable battery, such as, a mobile communication terminal, a digital camera, and so on. In addition, the wireless electrical power apparatus according to the present embodiment is also advantageous to a system that includes a power-transmitting unit and a power-receiving unit which operates while consuming electrical power supplied from the power-transmitting unit. In other words, the wireless electrical power apparatus according to the present embodiment is also advantageous to systems that do not include a recharging function in the power-receiving unit.

In addition, FIGS. 4A through 4D are the examples of the structures in which the coupling state between the power receiver coil 21 and the power pickup coil 22 is capable of being changed, and structures at least capable of changing the coupling state between the power receiver coil 21 and the power pickup coil 22 are not limited to these structures disclosed above. For example, it is also possible to provide the power pickup coil 22 with variable inductance to change the resonance frequency of the power pickup coil 22.

Although the current detection element 25 is disclosed as one example of the detector of the present embodiment, it is also possible to use elements other than the current detection element. Although the motor 28 is disclosed as one example of the driver of the present embodiment, it is also possible to use mechanisms other than the motor. Although the switch 27 is disclosed as one example of the switcher of the present embodiment, it is also possible to use circuits other than the switch.

The present embodiment is advantageous to the wireless electrical power apparatus capable of supplying electrical power to the receiving unit from the transmitting unit in a wireless manner.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless power apparatus comprising:
a power receiver coil which receives power, as magnetic field energy, from a power transmitter coil by magnetic field resonance produced between the power transmitter coil and the power receiver coil;
a power pickup coil which derives power from the power receiver coil by electromagnetic induction;
a detector which detects current flowing through the power pickup coil; and
a controller which controls a coupling strength between the power pickup coil and the power receiver coil based on the current detected by the detector.

2. The wireless power apparatus according to claim 1, wherein
the controller performs the control so that the coupling strength between the power pickup coil and the power receiver coil is increased in response to an increase in the current flowing through the power pickup coil, and the coupling strength between the power pickup coil and the power receiver coil is decreased in response to a decrease in the current flowing through the power pickup coil.

3. The wireless power apparatus according to claim 1, further comprising:
a driver which is capable of displacing the power pickup coil so that the coupling strength of the power receiver coil and the power pickup coil is changed, wherein
the controller controls the driver so that the power pickup coil is displaced based on the current detected by the detector.

4. The wireless power apparatus according to claim 1, wherein
the power pickup coil comprises:
a plurality of coils each having a different coupling strength relative to the power receiver coil; and
a switcher capable of selecting at least one of the plurality of coils, wherein
the controller controls switching of the switcher based on the current detected by the detector.

5. The wireless power apparatus according to claim 2, further comprising:
a driver which is capable of displacing the power pickup coil so that the coupling strength of the power receiver coil and the power pickup coil is changed, wherein
the controller controls the driver so that the power pickup coil is displaced based on the current detected by the detector.

6. The wireless power apparatus according to claim 2, wherein
the power pickup coil comprises:
a plurality of coils each having a different coupling strength relative to the power receiver coil; and
a switcher capable of selecting at least one of the plurality of coils, wherein
the controller controls switching of the switcher based on the current detected by the detector.

7. A wireless power-receiving method comprising:
supplying power, as magnetic field energy, to a power receiver coil from a power transmitter coil by use of magnetic field resonance produced between the power transmitter coil and the power receiver coil;
deriving power from the power receiver coil to the power pickup coil by electromagnetic induction;
detecting current flowing through the power pickup coil; and
controlling a coupling strength between the power pickup coil and the power receiver coil based on amplitude of the current detected by the detector.

8. The wireless power-receiving method according to claim 7, further comprising:
increasing the coupling strength between the power pickup coil and the power receiver coil in response to an increase in the current flowing through the power pickup coil, and decreasing the coupling strength between the power pickup coil and the power receiver coil in response to a decrease in the current flowing through the power pickup coil.

9. The wireless power-receiving method according to claim 7, further comprising:

controlling the coupling strength between the power receiver coil and the power pickup coil by displacing the power pickup coil.

10. The wireless power-receiving method according to claim 7, further comprising:

controlling the coupling strength between the power receiver coil and the power pickup coil by selecting at least one of a plurality of power pickup coils each having a different coupling strength relative to the power receiver coil.

11. The wireless power-receiving method according to claim 8, further comprising:

controlling the coupling strength between the power receiver coil and the power pickup coil by displacing the power pickup coil.

12. The wireless power-receiving method according to claim 8, further comprising:

controlling the coupling strength between the power receiver coil and the power pickup coil by selecting at least one of a plurality of power pickup coils each having a different coupling strength relative to the power receiver coil.

* * * * *